(12) United States Patent
Dobrin et al.

(10) Patent No.: US 9,175,648 B2
(45) Date of Patent: Nov. 3, 2015

(54) INTAKE SYSTEM HAVING A SILENCER DEVICE

(71) Applicant: Ford Global Technologies, LLC, Dearborn, MI (US)

(72) Inventors: Victor Dobrin, Ypsilanti, MI (US); Aamir Asgharali Marvi, Northville, MI (US); Darrell Dwight Huddleston, Manchester, MI (US); Lloyd Anthony Bozzi, Saline, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/056,317

(22) Filed: Oct. 17, 2013

(65) Prior Publication Data
US 2015/0107935 A1 Apr. 23, 2015

(51) Int. Cl.
| F01N 1/02 | (2006.01) |
| F02M 35/14 | (2006.01) |
| F02M 35/12 | (2006.01) |
| F01N 1/00 | (2006.01) |
| F02B 29/04 | (2006.01) |

(52) U.S. Cl.
CPC ....... *F02M 35/1211* (2013.01); *F02M 35/1261* (2013.01); *F02M 35/1266* (2013.01); *F02B 29/04* (2013.01); *Y02T 10/146* (2013.01)

(58) Field of Classification Search
CPC ........... F01N 1/003; F01N 1/006; F01N 1/02; F01N 1/026; F02M 35/12; F02M 35/1233; F02M 35/1255; F02M 35/1266
USPC ......... 181/227, 228, 229, 249, 255, 251, 269, 181/272, 281; 123/184.53, 184.57
See application file for complete search history.

(56) References Cited

U.S. PATENT DOCUMENTS

| 2,928,492 | A | * | 3/1960 | Nelson | 181/275 |
| 3,966,014 | A | * | 6/1976 | Gowing | 181/229 |
| 4,064,962 | A | * | 12/1977 | Hunt | 181/272 |
| 4,108,276 | A | * | 8/1978 | Hall et al. | 181/256 |
| 4,192,403 | A | * | 3/1980 | Nakagawa et al. | 181/268 |
| 4,203,503 | A | * | 5/1980 | Franco et al. | 181/272 |
| 4,712,644 | A | * | 12/1987 | Sun | 181/251 |
| 4,969,537 | A | * | 11/1990 | Wagner et al. | 181/255 |
| 5,572,966 | A |   | 11/1996 | Doddy et al. | |
| 5,762,858 | A | * | 6/1998 | Maeda et al. | 264/516 |
| 5,806,480 | A | * | 9/1998 | Maeda et al. | 123/184.57 |
| 5,839,405 | A | * | 11/1998 | Falkowski et al. | 123/184.57 |
| 5,902,970 | A | * | 5/1999 | Ferri | 181/249 |
| 5,979,598 | A | * | 11/1999 | Wolf et al. | 181/272 |
| 6,116,377 | A | * | 9/2000 | Dugan | 181/272 |
| 6,283,246 | B1 | * | 9/2001 | Nishikawa | 181/255 |

(Continued)

FOREIGN PATENT DOCUMENTS

WO 0127461 A1 4/2001

*Primary Examiner* — Edgardo San Martin
(74) *Attorney, Agent, or Firm* — Greg Brown; Alleman Hall McCoy Russell & Tuttle LLP

(57) ABSTRACT

An intake silencer device is described herein. The intake silencer device includes an outer housing and a plurality of sequential arranged expansion chambers separated by walls. The intake silencer device further includes an inner tube positioned in each of the sequential chambers, each of the inner tubes including an opening providing fluidic communication between an interior of the tube and the corresponding expansion chamber, a size of the openings increasing in size sequentially in a downstream direction.

20 Claims, 5 Drawing Sheets

(56) References Cited

U.S. PATENT DOCUMENTS

| | | |
|---|---|---|
| 6,684,842 B1 | 2/2004 | Hellie et al. |
| 6,752,240 B1 * | 6/2004 | Schlagenhaft ............... 181/249 |
| 6,938,601 B2 * | 9/2005 | Fukumoto ............... 123/184.57 |
| 7,278,514 B1 * | 10/2007 | Quigley ...................... 181/256 |
| 7,444,806 B2 * | 11/2008 | Werber et al. ................. 60/322 |
| 7,584,821 B2 | 9/2009 | Prior et al. |
| 7,669,693 B2 * | 3/2010 | Yamaguchi et al. ......... 181/255 |
| 7,934,581 B2 * | 5/2011 | Kim et al. .................... 181/250 |
| 8,177,024 B2 * | 5/2012 | Caliskan ...................... 181/250 |
| 8,323,556 B2 * | 12/2012 | Khami et al. ................. 264/537 |
| 8,360,119 B2 | 1/2013 | Huang et al. |
| 2005/0150718 A1 * | 7/2005 | Knight et al. ................ 181/250 |
| 2013/0263822 A1 * | 10/2013 | Denker et al. ................ 123/434 |

* cited by examiner

INTAKE SYSTEM HAVING A SILENCER DEVICE

FIELD

The present disclosure relates an intake system having a silencer device.

BACKGROUND AND SUMMARY

Engine intake systems may generate noise which may be transmitted through various components in the intake system to a vehicle cabin. The vehicle operation and/or passengers may find this noise displeasing. Consequently, customer satisfaction may be decreased. For example, a turbocharger compressor may generate noises during operation, which may be transmitted to the vehicle cabin. Other intake system components, such as a throttle, may also generate noises, further decreasing customer satisfaction. Specifically, the noises may resonate through various intake conduits and be transferred through various medium to the vehicle cabin.

U.S. Pat. No. 6,684,842 discloses a multi-chamber resonator box for a vehicle air intake system. The resonator box is configured to reduce the audible frequencies generated in the intake system. The Inventors have recognized several drawbacks with the multi-chamber resonator disclosed in U.S. Pat. No. 6,684,842. For instance, the resonator box may still generate audible frequencies due to the position and geometry of the expansion chambers in the resonator. Furthermore, the resonator box disclosed in U.S. Pat. No. 6,684,842 may increase losses in the intake system due to the geometry of the inlet and outlet ports. Consequently, combustion efficiency may be decreased, negatively impacting engine performance.

The inventors herein have recognized the above issues and developed an intake silencer device. The intake silencer device includes an outer housing and a plurality of sequentially arranged expansion chambers separated by walls. The intake silencer device further includes an inner tube positioned in each of the sequential chambers, each of the inner tubes including an opening providing fluidic communication between an interior of the tube and the corresponding expansion chamber, a size of the openings increasing in size sequentially in a downstream direction.

The sequential arrangement of openings increasing in size in a downstream direction enables a range of frequencies to be attenuated by the silencer device. Consequently, noise, vibration, and harshness (NVH) in the intake system is decreased. In one example, the outer housing may be cylindrical in geometry. The cylindrical geometry of the outer housing enables the housing to be easily and inexpensively manufactured if desired. Moreover, the cylindrical shape increases the durability of the silencer device, when compared to other shapes. Furthermore, the cylindrical shape of the device enables a desired compactness to be achieved for packaging the silencer device in the intake system, if desired.

Therefore, the technical results achieved via the silencer device include reducing noise generation in the intake system, increasing the compactness of the intake system, and decreasing the manufacturing costs of the intake system. As a result, customer satisfaction is increased.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure. Additionally, the above issues have been recognized by the inventors herein, and are not admitted to be known.

BRIEF DESCRIPTION OF THE DRAWINGS

FIGS. 2-4 are drawn approximately to scale, however other relative dimensions may be used, if desired.

DETAILED DESCRIPTION

An intake silencer device is described herein. It will be appreciated that the device may be positioned in an intake system of an engine. The silencer device decreases noise generated in the intake system. The silencer device includes a plurality of sequentially arranged expansion chambers separated by walls and an inner tube positioned in each of the sequential chambers. Each of the inner tubes includes an opening providing fluidic communication between an interior of the tube and the corresponding expansion chamber. The size of the openings increases in a downstream direction. The expansion chamber and variation in sizing of the openings into the chamber enables a wide range of frequencies to be attenuated by the silencer device. The expansion chambers act as resonators (e.g., Helmholtz resonators) to attenuate desired frequencies. As a result, noise, vibration, and harshness (NVH) is decreased in the intake system, thereby increasing customer satisfaction.

Figure 1:
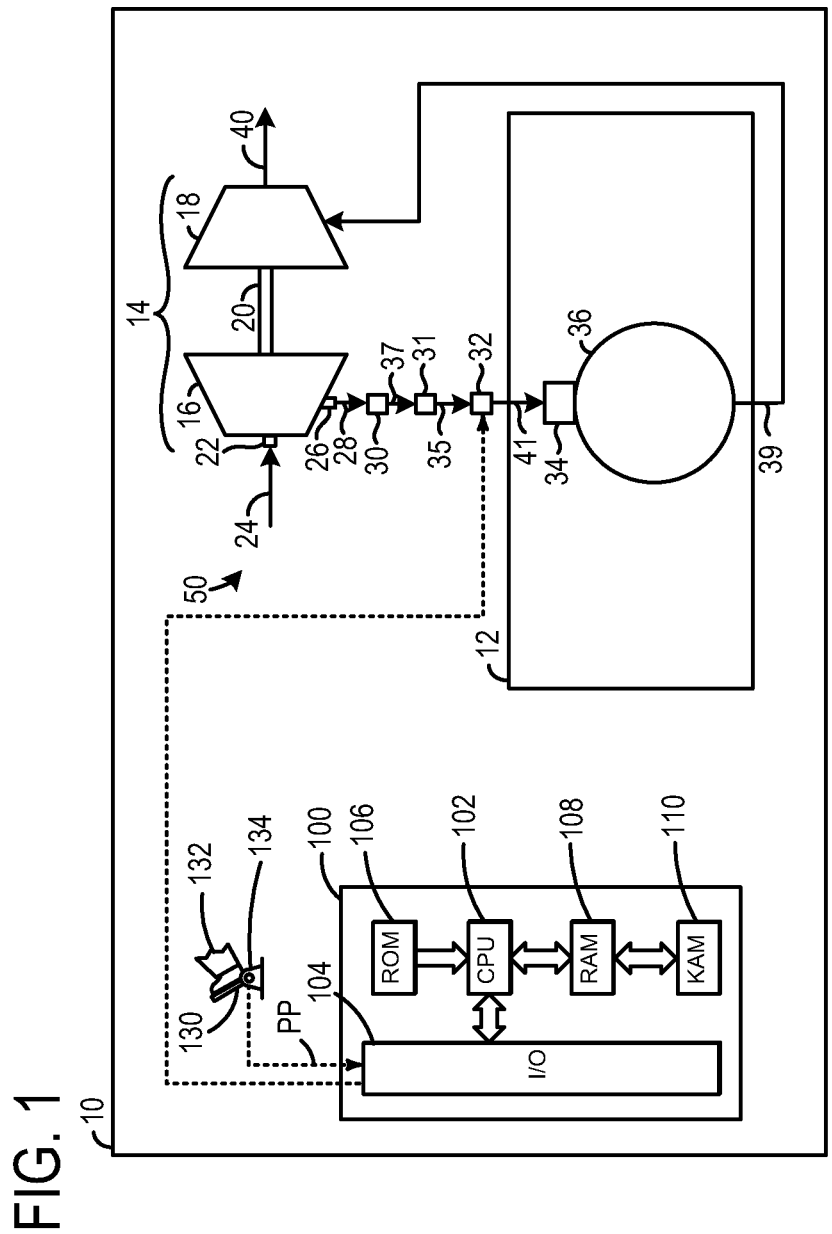
FIG. 1 shows a schematic depiction of a vehicle having an intake system including an intake silencer device.

FIG. 1 shows a schematic depiction of a vehicle 10 including an engine 12. The engine 12 is configured to implement combustion operation. For example, a four stroke combustion cycle may be implemented including an intake stroke, a compression stroke, a power stroke, and an exhaust stroke. However, other types of combustion cycles may be utilized in other examples. In this way, motive power may be generated in the vehicle 10. It will be appreciated that the engine may be coupled to a transmission for transferring rotation power generated in the engine to wheels in the vehicle.

The vehicle 10 includes a turbocharger 14 having a compressor 16 coupled to turbine 18. A shaft 20 or other suitable mechanical coupling device may be used to couple the compressor 16 to the turbine 18. The compressor 16 is configured to increase the pressure of intake air flowing therethrough. On the other hand, the turbine 18 is configured to extract energy from the exhaust gas and convert it into mechanical energy and transfer this energy to the compressor.

Figure 2:
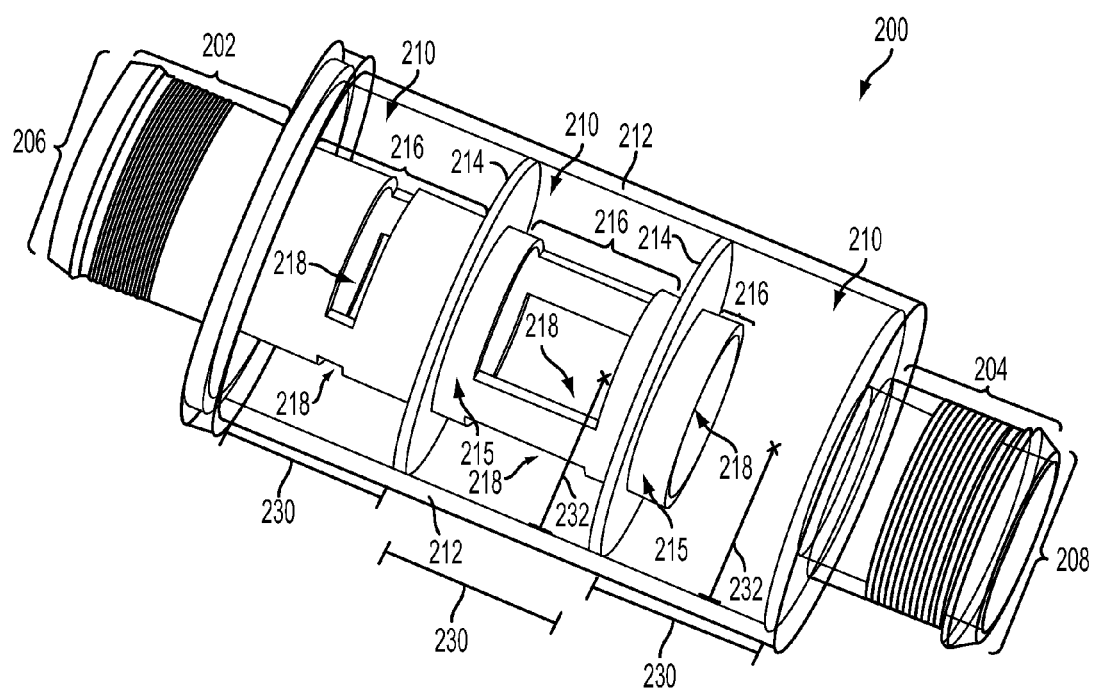
FIG. 2 shows an example intake silencer device.
Figure 3:
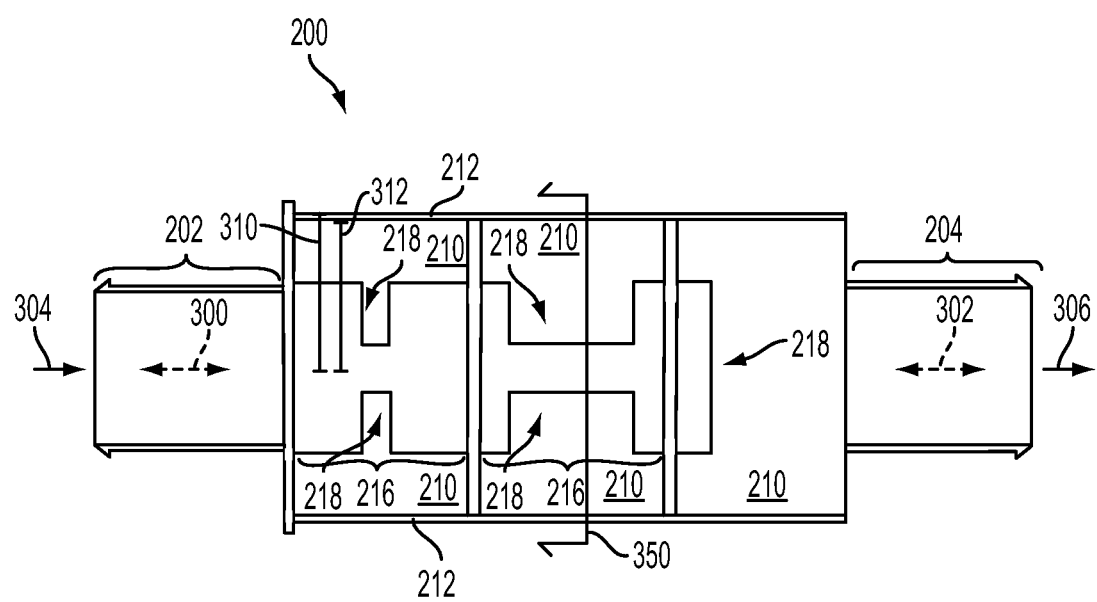
FIG. 3 shows another view of the intake silencer device shown in FIG. 2.
Figure 4:
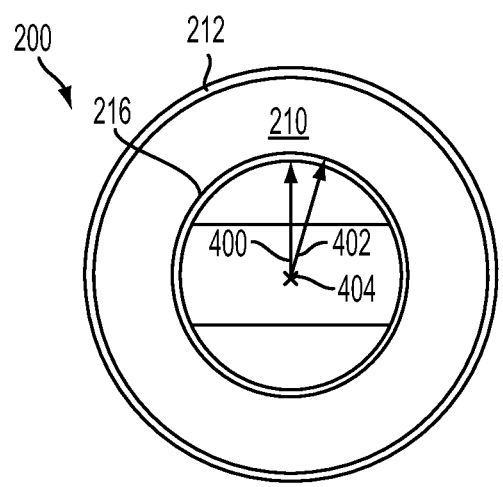
FIG. 4 shows a cross-sectional view of the intake silencer device shown in FIG. 4.

The compressor 16 includes an inlet 22 receiving intake air from an intake conduit 24, denoted via an arrow. The compressor 16 further includes an outlet 26. An intake conduit 28 flows compressed air from the outlet 26 of the compressor 16 to an intake silencer device 30. However, in other examples the intake silencer device 30 may be positioned upstream of the compressor 16. The intake silencer device 30 is configured to reduce noises generated in an intake system 50, which includes the silencer device. Specifically, the silencer device is configured to attenuate a large range of audible frequencies. A detailed illustration of an example intake silencer device is shown in FIGS. 2-4 and discussed in greater detail herein. The intake system 50 also includes the intake conduits 24 and 28, the compressor 16, charge air cooler 31, a throttle 32, and an intake manifold 34. The charger air cooler 31 is configured to remove heat from intake air flowing therethrough. In another example, the charge air cooler 31 may be omitted from the intake system. The throttle is configured to adjust the airflow therethrough to alter the engine's power output. Additionally, the intake manifold 34 is configured to provide intake air to the cylinder in the engine 12. It will be appreciated that in a multi-cylinder engine the intake manifold may provide intake air to the plurality of cylinders in the engine.

The intake silencer device 30 is schematically depicted in FIG. 1. However, it will be appreciated that the intake silencer device 30 has additional complexity that is not depicted in FIG. 1. A detailed view of the intake silencer device 30 is shown in FIGS. 2-3 and discussed in greater detail herein.

An intake conduit 37, denoted via an arrow, provides fluidic communication between the intake silencer device 30 and the charge air cooler 31. Another intake conduit 41, denoted via an arrow provides fluidic communication between the charge air cooler and the throttle 32. In another example, the intake silencer device 30 may be in direct fluidic communication with an intake manifold. Another intake conduit 38, denoted via an arrow, provides fluidic communication between the throttle 32 and an intake manifold 34. The intake manifold 34 is in fluidic communication with a cylinder 36. It will be appreciated that engines with alternate number of cylinders have been contemplated. Moreover, the multiple cylinders may have a variety of configuration such as an inline configuration, a V-configuration, a horizontally opposed configuration, etc. It will be appreciated that the intake system may include additional components such as a filter, an intercooler, etc.

An exhaust conduit 39, denoted via an arrow, provides fluidic communication between the cylinder 36 and an inlet of the turbine 18. Additionally, an exhaust conduit 40, denoted via an arrow, is in fluidic communication with an outlet of the turbine 18.

A controller 100 may be included in the vehicle 10. The controller 100 may be configured to receive signals from sensors in the vehicle as well as send command signals to components. Various components in the vehicle 10 may be controlled at least partially by a control system including the controller 100 and by input from a vehicle operator 132 via an input device 130. In this example, input device 130 includes an accelerator pedal and a pedal position sensor 134 for generating a proportional pedal position signal PP. The controller 100 is shown in FIG. 1 as a microcomputer, including processor 102 (e.g., microprocessor unit), input/output ports 104, an electronic storage medium for executable programs and calibration values shown as read only memory 106 (e.g., read only memory chip) in this particular example, random access memory 108, keep alive memory 110, and a data bus. Storage medium read-only memory 106 can be programmed with computer readable data representing instructions executable by processor 102 for performing the methods described below as well as other variants that are anticipated but not specifically listed. As shown, the controller 100 sends a signal to the throttle 32.

FIG. 2 shows a perspective view of an example intake silencer device 200. It will be appreciated that intake silencer device 200 may be included in an intake system of an engine. Therefore, the intake silencer device 200 may be positioned in the intake system in a similar arrangement to the intake silencer device 30, shown in FIG. 1.

The intake silencer device 200 includes an inlet port 202 and an outlet port 204. The inlet port and/or outlet port may have an axial length of 32 millimeters (mm), in one example. The inlet port 202 may be in fluidic communication with an intake conduit and the outlet port 204 may be in fluidic communication (e.g., direct fluidic communication) with a charge air cooler, in one example. It will be appreciated that direct fluidic communication means that there are no intervening components between the components in fluidic communication. In one example, the inlet port 202 may be in fluidic communication with an upstream compressor. However, in other examples the silencer device may be in fluidic communication with other intake system components. For instance, the intake silencer device may be positioned upstream of a compressor in another example. The inlet port 202 includes an inlet opening 206 and the outlet port 204 includes an outlet opening 208. The intake silencer device 200 further includes a plurality of sequentially arranged expansion chambers 210. In one example, the volume of each expansion chamber is substantially the same, for example differently only by the volume of the annular wall of the inner tube. Each of the expansion chambers 210 is configured to attenuate different frequencies. In this way, a wide range of noises generated in the intake system may be attenuated. The axial lengths 230 of the expansion chambers 210 do not vary from chamber to chamber, in the depicted example. Further in the depicted example, the outer radii 232 of the expansion chambers 210 do not vary from chamber to chamber. However, in other examples the axial lengths and/or outer radii of the expansion chambers may vary from chamber to chamber.

The intake silencer device 200 further includes an outer housing 212. In the depicted example, the outer housing 212 is cylindrical. Thus the outer housing may be referred to as the cylindrical outer housing, in one example. However, other outer housing geometries have been contemplated. It will be appreciated that a housing having a cylindrical shape may be less costly to manufacture than other housing geometries and have greater structural integrity. Thus, the cylindrical shape of the outer housing decreases production costs and increases the structural integrity of the device.

The expansion chambers 210 are separated by walls 214 and sequentially arranged. The walls 214 are arranged perpendicular to the outer housing 212 and have a wall thickness, which outer portions of the respective walls facing the expansion chambers directly. In one example, each of the walls 214 extend radially from the outer housing 212, each wall being parallel with one another, and each outer portion of each of the walls being parallel. The walls 214 have circular openings 215 where inner tubes 216 extend therethrough. Additionally in the depicted example the walls 214 extend from an outer surface of the inner tubes 216 to an inner surface of an outer housing 212. The walls 214 each have an equivalent axial wall thickness, in the depicted example. However, in other examples the axial thickness of the walls may vary. Specifically, the axial thickness of the walls may be 2 (mm), in one example. Additionally, the outer radius of the walls 214 is substantially equivalent. The walls define a portion of the boundary of the expansion chambers 210. The outer housing 212 defines another portion of the boundary of the expansion chambers 210. An exterior surface of the inner tubes 216 defines another portion of the boundary of the expansion chambers.

The intake silencer device 200 also includes a plurality of inner tubes 216. As shown, there is an inner tube positioned in each of the expansion chambers. The inner tubes 216 are axially aligned, in the depicted example. However, in other examples two or more of the inner tubes may be axially offset. It will be appreciated that the inner tubes 216 are hollow. Therefore, intake air travels through the inner tubes 216. In the depicted example, each of the inner tubes 216 is formed via a common inner tube passing through walls 214 of a plurality of the expansion chambers 210, the tube formed of a continuous tube having the openings therein. Additionally, in the depicted example, the inner tube adjacent to the outlet port 204 does not axially span the corresponding expansion chamber. However, other inner tube geometries have been contemplated.

Each of the inner tubes 216 includes one or two, or more, openings 218. In one example, the two upstream tubes each have exactly two only partially annular openings, opposite one another, whereas the downstream-most tube has a singular opening that extending entirely around the tube as a complete opening of the tube. The two openings in the upstream pipes may be defined by partial annular shapes of constant thickness positioned directly opposite each other across the central flow axis of the tubes and the overall device. The openings provide fluidic communication between an interior of the inner tube and the corresponding expansion chamber. In one example, the openings may each be arranged in an equivalent radial position. The openings 218 provide fluidic communication between an interior region of the inner tube and a corresponding expansion chamber. The size of the openings increases in size sequentially in a downstream direction. The frequencies attenuated in the expansion chambers may depend on the size and geometry of the openings. Therefore, the characteristics of the intake silencer device 200 may be tuned to achieve desired attenuation characteristics of the silencer.

The openings 218 have a rectangular cross-section, in the depicted example. However, other geometries of the openings have been contemplated. Further in some examples, one or more of the inner tubes may include perforations. Additionally, the thickness of the inner tubes in the regions of the openings may be 10 mm thick, in one example.

As explained herein, the silencer device 200 may have a plurality of contiguous, sequential, evenly spaced internal volume sections within an expended outer diameter region of the device, between an inlet and an outlet. Each of the internal volume sections may communicate with each other only through an inner tube that passes fully through at least some, for example a majority of, the volumes. In one example, the inner tube passes fully through two, and only partially through a third, volume, in that order in a downstream direction, of the device. From the upstream inlet to the downstream outlet, the cross-sectional opening in the tube allowing direct communication between an outer portion of the volume to an internal portion of the volume, increases. For example, the communication area may increase non-linearly in the downstream direction such that the communication area of the second volume (in a downstream direction) is more than twice that of the first volume, and that of the third volume is more than twice that of the second. In one example, the volumes are created by dividing walls that are formed and directly coupled with the inner tube, where the inner tube is fixed in the device by the circular dividing walls being fixed to an outer housing of the device. In this way, bolts and other connectors can be avoided, in one example, at least between the inlet and outlet of the device. Further, in one example, there are no other volumes communicating with the gas flow between the three volumes identified, nor are there any other inlets or outlets anywhere in the device other than a single primary inlet and a single primary outlet In one example, the device may have each of the sequential volumes axially aligned with the inlet and outlet of the device, such that each of the separating walls and internal tubes all share a common central axis.

FIG. 3 shows a cross-sectional view of the intake silencer device 200 shown in FIG. 2. As shown, a central axis 300 of the inlet port 202 is aligned with a central axis 302 of the outlet port 204. Thus, the inlet port 202 is axially aligned with an outlet port.

As previously discussed, the inlet port 202 may receive intake air from upstream components and the outlet port 204 may flow intake air to downstream components. Arrow 304 indicates intake airflow from upstream components (e.g., a compressor) and arrow 306 indicates intake airflow to downstream components (e.g., an intake manifold). As shows, the longitudinal length (e.g., axial length) of each of the expansion chambers is substantially equivalent. However, other expansion chamber geometries have been contemplated.

As shown, the outer radius 310 and inner radius 312 of the outer housing 212 do not vary between the downstream edge of the inlet port 202 and the upstream edge of the outlet port 204. Thus, the outer housing 212 is cylindrical. However, other outer housing geometries have been contemplated. Additionally in the depicted example, the inner radius of the outer housing 212 does not vary along the length spanning the expansion chambers 210. However, other outer housing geometries have been contemplated.

The openings 218 of the inner tubes 216 are also shown in FIG. 3. The openings 218 are shown extending into the inner tubes in a rectangular cross-section. Additionally, the inner tubes 216 that having two openings have the openings arranged on opposing sides of the corresponding inner tubes. A cutting plane 350 defining the cross-section in FIG. 4 is illustrated in FIG. 3.

As shown, the inner tube closest to the outlet port does not axially extend across the corresponding expansion chamber 210. However, the other inner tubes extend across their respective expansion chambers.

It will be appreciated that the openings in a common inner tube have a substantially equivalent size and geometry. However, in other examples the size and/or geometries of the openings in a common inner tube may vary.

A ratio between the axial length of one of the smallest opening and the axial length of the corresponding inner tube may be 1/7. Additionally, a ratio between an axial length of the openings in middle inner tube and an axial length of the middle inner tube may be 23/35.

FIG. 4 shows another cross-sectional view of the intake silencer device 200. The outer housing 212, one of the inner tubes 216, and one of the expansion chambers 210 is illustrated. As shown the inner tube is hollow thereby enabling air to flow therethrough.

It will be appreciated that an inner radius 400 and an outer radius 402 of the inner tubes does not vary between tubes. As shown the cross-section of the expansion chamber 210 is annular. The annular cross-section is perpendicular to a central axis 404 of the intake silencer device 200. It will be appreciated that the expansion chambers 210 extend 360 degrees around inner tubes with no intervening components, walls, etc. Further, it will be appreciated that the annular geometry of the expansion chambers enables a greater amount of noise to be attenuated.

Figure 5:
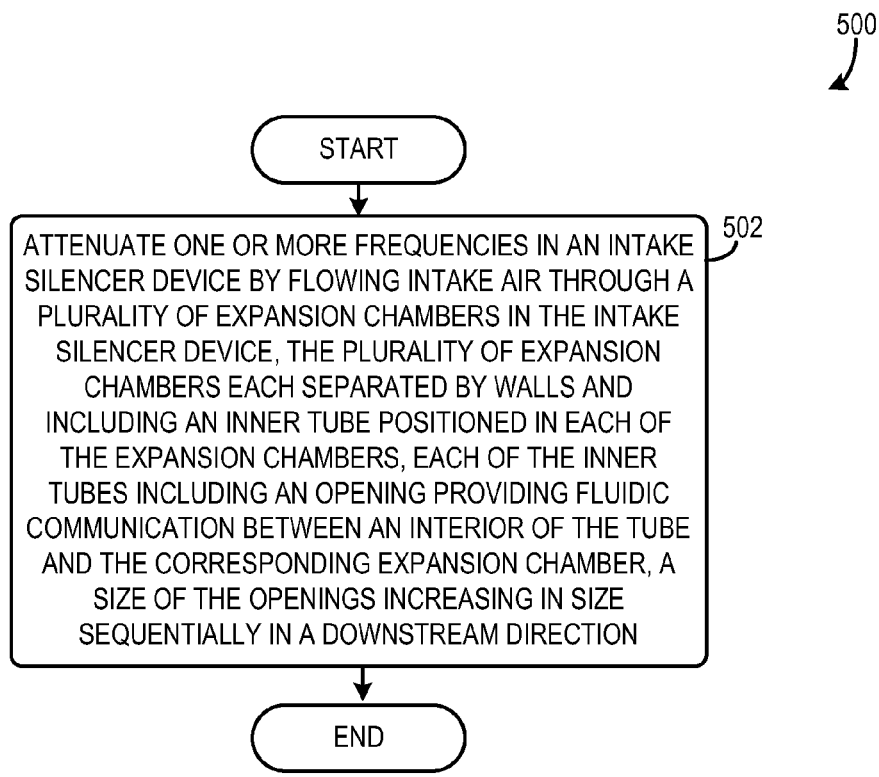
FIG. 5 shows a method for operation of an intake system.

FIG. 5 shows a method 500 for operating an intake system. The method 500 may be implemented via the exhaust systems discussed above with regard to FIGS. 1-4 or may be implemented via other suitable intake systems.

At 502 the method includes attenuating one or more frequencies in an intake silencer device by flowing intake air through a plurality of expansion chambers in the intake silencer device, the plurality of expansion chambers each separated by walls and including an inner tube positioned in each of the expansion chambers, each of the inner tubes including an opening providing fluidic communication between an interior of the tube and the corresponding expansion chamber, a size of the openings increases sequentially in a downstream direction. In this way, a wide range of frequencies may be attenuated via the silencer device, thereby reducing NVH generated in the intake system. Consequently, customer satisfaction may be increased.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An intake silencer device comprising:
a cylindrical outer housing;
a plurality of sequentially arranged expansion chambers separated by walls; and
an inner tube positioned in each of the sequential expansion chambers, each of the inner tubes including an opening providing fluidic communication between an interior of the tube and the corresponding expansion chamber, a size of the openings increasing in size sequentially in a downstream direction;
wherein the inner tube positioned in the expansion chamber at a downstream end of the housing extends only partially from the wall of said expansion chamber and does not axially span a length of the expansion chamber in its entirety, the opening of the inner tube positioned in the expansion chamber at the downstream end of the housing being circular and aligned with a central axis of each of the inner tubes, and
wherein an inner radius of the cylindrical outer housing does not vary along a length spanning the expansion chambers.

2. The intake silencer device of claim 1, where the openings in upstream tubes are arranged in an equivalent radial position.

3. The intake silencer device of claim 1, where each of the expansion chambers extend 360 degrees around the corresponding inner tube, and wherein each of the inner tubes is formed via a common inner tube passing through the walls, the tube formed of a continuous tube having the openings therein, and wherein at least two upstream tubes each have exactly two only partially annular openings, opposite one another, and wherein a downstream-most tube has a singular opening that extends entirely around the tube as a complete opening of the tube facing a downstream flow direction.

4. The intake silencer device of claim 1, further comprising an inlet port axially aligned with an outlet port.

5. The intake silencer device of claim 1, where openings in upstream inner tubes extend into the respective inner tubes in a rectangular cross-section.

6. The intake silencer device of claim 1, where the walls extend from an outer surface of the inner tubes to an inner surface of the cylindrical outer housing.

7. The intake silencer device of claim 6, where the walls extend in a radial direction.

8. An intake silencer device comprising:
a cylindrical outer housing;
a plurality of sequentially arranged expansion chambers separated by walls; and
an inner tube positioned in each of the expansion chambers, each of the inner tubes including an opening providing fluidic communication between an interior of the tube and the corresponding expansion chamber, where each of the expansion chambers extend 360 degrees around the corresponding inner tube;
wherein the inner tube positioned in the expansion chamber at a downstream end of the housing extends only partially from the wall of said expansion chamber and does not axially span a length of the expansion chamber in its entirety,
wherein the opening of the inner tube positioned in the expansion chamber at the downstream end of the housing has a central axis aligned with a central axis of the inner tube, and
wherein an inner radius of the cylindrical outer housing does not vary along a length spanning the expansion chambers.

9. The intake silencer device of claim 8, where the cylindrical outer housing and the walls are boundaries of the expansion chambers.

10. The intake silencer device of claim 9, where the expansion chambers are in fluidic communication with an inlet port and an outlet port.

11. The intake silencer device of claim 10, where the outlet port is in fluidic communication with a charge air cooler.

12. The intake silencer device of claim 8, where the plurality of inner tubes are sequentially arranged in direct fluidic communication and axially aligned.

13. The intake silencer device of claim 8, where the one or more walls are arranged perpendicular to a longitudinal axis of the cylindrical outer housing.

14. The intake silencer device of claim 8, where each of the one or more walls comprises a circular opening having a portion of one or more of the inner tubes extending therethrough.

15. The intake silencer device of claim 8, where the inner tubes each comprise one or more perforations.

16. An intake silencer device comprising:
    an outlet port;
    a cylindrical outer housing;
    a plurality of sequentially arranged expansion chambers separated by walls; and
    a cylindrical tube axially extending through the walls and including a plurality of openings but axially spanning only a portion of a last expansion chamber adjacent to the outlet port, where the plurality of openings include at least one opening in fluidic communication with each expansion chamber,
    wherein the portion of the tube in the last expansion chamber has a singular opening extending entirely around the tube as a complete opening of the tube, and
    wherein an inner radius of the cylindrical outer housing does not vary along a length spanning the expansion chambers.

17. The intake silencer device of claim 16, where the plurality of openings have a rectangular cross-section.

18. The intake silencer device of claim 16, where the expansion chambers have an annular cross-section.

19. The intake silencer of claim 8, wherein at least two upstream tubes each have exactly two only partially annular openings, opposite one another, and wherein a downstream-most tube has a singular opening that extends entirely around the tube as a complete opening of the tube.

20. A system comprising:
    an intake silencer device comprising:
        a cylindrical outer housing;
        a plurality of sequentially arranged expansion chambers separated by walls; and
        an inner tube positioned in each of the sequential expansion chambers, each of the inner tubes including an opening providing fluidic communication between an interior of the tube and the corresponding expansion chamber, a size of the openings increasing in size sequentially in a downstream direction;
        wherein the inner tube positioned in the expansion chamber at a downstream end of the housing extends only partially from the wall of said expansion chamber and does not axially span a length of the expansion chamber in its entirety, the opening of the inner tube positioned in the expansion chamber at the downstream end of the housing being circular and aligned with a central axis of each of the inner tubes, and wherein an inner radius of the cylindrical outer housing does not vary along a length spanning the expansion chambers;
    a compressor of a turbocharger coupled upstream of the intake silencer device; and
    an engine coupled downstream of the intake silencer device.

* * * * *